(12) United States Patent
Yamaguchi et al.

(10) Patent No.: US 10,680,254 B2
(45) Date of Patent: Jun. 9, 2020

(54) REDOX FLOW BATTERY (71) Applicant: Sumitomo Electric Industries, Ltd., Osaka-shi (JP)

(72) Inventors: Hideyuki Yamaguchi, Osaka (JP); Seiji Ogino, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 15/556,408

(22) PCT Filed: Dec. 8, 2016

(86) PCT No.: PCT/JP2016/086643
§ 371 (c)(1),
(2) Date: Sep. 7, 2017

(87) PCT Pub. No.: WO2018/105091
PCT Pub. Date: Jun. 14, 2018

(65) Prior Publication Data
US 2018/0277859 A1 Sep. 27, 2018

(51) Int. Cl.
H01M 8/00 (2016.01)
H01M 8/0247 (2016.01)
H01M 8/0273 (2016.01)
H01M 8/18 (2006.01)
H01M 8/02 (2016.01)
H01M 8/2485 (2016.01)

(52) U.S. Cl.
CPC .......... H01M 8/0247 (2013.01); H01M 8/02 (2013.01); H01M 8/0273 (2013.01); H01M 8/188 (2013.01); H01M 8/2485 (2013.01); Y02E 60/528 (2013.01)

(58) Field of Classification Search
CPC ......... H01M 8/04186; H01M 8/04223; H01M 8/188
See application file for complete search history.

(56) References Cited

U.S. PATENT DOCUMENTS

2015/0155564 A1* 6/2015 Chami .................... H01M 2/26
                                                          429/149
2016/0049673 A1* 2/2016 Fukushima ........... H01M 8/188
                                                          429/429

(Continued)

FOREIGN PATENT DOCUMENTS

EP          3410528 A1    12/2018
JP       2006-324129 A    11/2006
JP       2014-139905 A     7/2014

(Continued)

Primary Examiner — Cynthia H Kelly
Assistant Examiner — Monique M Wills
(74) Attorney, Agent, or Firm — Baker Botts, L.L.P.; Michael A. Sartori (57) ABSTRACT A redox flow battery includes an electrode, a cell frame including a frame body and a bipolar plate and having a fitting recess in which the electrode is fitted, and a membrane disposed so as to sandwich the electrode between the bipolar plate and the membrane. In the redox flow battery, a gap between, among outer peripheral edge surfaces of the electrode, a side edge surface parallel to a direction in which an electrolyte flows and an inner wall surface of the fitting recess, the inner wall surface facing the side edge surface, is 0.1 mm or more and 12 mm or less.

6 Claims, 8 Drawing Sheets (56) References Cited

U.S. PATENT DOCUMENTS

2016/0164112 A1* 6/2016 Seipp .................... H01M 8/188
                                                    429/508
2017/0237104 A1    8/2017 Kanno et al.

FOREIGN PATENT DOCUMENTS

| JP | 2015-215948 A | 12/2015 |
| WO | 2016/072192 A1 | 5/2016 |
| WO | 2016/072191 A1 | 12/2016 |

* cited by examiner

REDOX FLOW BATTERY

TECHNICAL FIELD

The present invention relates to a redox flow battery.

BACKGROUND ART

Patent Literature 1 describes a cell stack in which a cell frame, a positive electrode, a membrane, a negative electrode, and a cell frame are repeatedly stacked, and the resulting stack body is sandwiched between supply/drainage plates; and a redox flow battery including the cell stack. The cell frames each include a bipolar plate disposed between the positive electrode and the negative electrode, and a frame body that supports the bipolar plate from the outer periphery of the bipolar plate. In this configuration, a single cell is formed between the bipolar plates of adjacent cell frames.

CITATION LIST

Patent Literature

PTL 1: Japanese Unexamined Patent Application Publication No. 2014-139905

SUMMARY OF INVENTION

A redox flow battery according to the present disclosure includes
  an electrode,
  a cell frame including a frame body and a bipolar plate and having a fitting recess in which the electrode is fitted, and
  a membrane disposed so as to sandwich the electrode between the bipolar plate and the membrane.
In the redox flow battery, a gap between, among outer peripheral edge surfaces of the electrode, a side edge surface parallel to a direction in which an electrolyte flows and an inner wall surface of the fitting recess, the inner wall surface facing the side edge surface, is 0.1 mm or more and 12 mm or less.

DESCRIPTION OF EMBODIMENTS

Technical Problem

In recent years, redox flow batteries have attracted attention as means for storing electricity of renewable energy, and there has been a requirement for the development of redox flow batteries having a high discharge capacity. To meet such a requirement, the inventors of the present invention focused on the fact that a leakage channel is formed between an outer peripheral edge surface of an electrode and an inner wall surface of a fitting portion of the electrode. The leakage channel is a gap between an electrode and a member facing an outer peripheral edge surface of the electrode. An electrolyte flowing in this leakage channel is drained from a cell substantially without contacting the electrode. Therefore, with an increase in the amount of electrolyte flowing through the leakage channel, the discharge capacity of the redox flow battery decreases. Thus, it is believed to be important to appropriately control the size of the leakage channel.

An object of the present disclosure is to provide a redox flow battery having a good discharge capacity by controlling the size of a leakage channel to an appropriate value.

Advantageous Effects of the Present Disclosure

The redox flow battery according to the present disclosure has a good battery performance.

DESCRIPTION OF EMBODIMENTS ACCORDING TO INVENTION OF THE PRESENT APPLICATION

Features of embodiments according to the invention of the present application will be first listed and described.

<1> A redox flow battery according to an embodiment includes
  an electrode,
  a cell frame including a frame body and a bipolar plate and having a fitting recess in which the electrode is fitted, and
  a membrane disposed so as to sandwich the electrode between the bipolar plate and the membrane.
In the redox flow battery, a gap between, among outer peripheral edge surfaces of the electrode, a side edge surface parallel to a direction in which an electrolyte flows and an inner wall surface of the fitting recess, the inner wall surface facing the side edge surface, is 0.1 mm or more and 12 mm or less.

In the configuration in which an electrode is fitted in a fitting recess of a cell frame, leakage channels are formed between outer peripheral edge surfaces of the electrode and corresponding inner wall surfaces of the fitting recess. When, among the leakage channels, a portion parallel to a direction in which an electrolyte flows, that is, a side leakage channel formed between a side edge surface of the electrode and an inner wall surface of the fitting recess, the inner wall surface facing the side edge surface, has a small width, the amount of electrolyte flowing through the side leakage channel can be reduced. As a result, a decrease in the discharge capacity of the redox flow battery can be suppressed. Specifically, when the side leakage channel has a width of 12 mm or less, a decrease in the discharge capacity of the redox flow battery can be efficiently suppressed. A decrease in the width of the side leakage channel enables the amount of electrolyte flowing through the side leakage channel to be reduced. Therefore, the width of the side leakage channel is preferably 6 mm or less, and more preferably 3 mm or less. Herein, the term "direction in which an electrolyte flows" refers to a direction from a frame piece of the frame body having a liquid-supplying manifold toward a frame piece of the frame body having a liquid-draining manifold.

With a decrease in the width of the side leakage channel, the amount of electrolyte flowing through the side leakage channel can be reduced. However, when the width of the side leakage channel is excessively small, there is a concern that a membrane that faces the electrode may be damaged. This is because when the width of the side leakage channel is excessively small, during the compression of a cell or during flow of an electrolyte, an outer peripheral edge of the electrode may protrude from the fitting recess, and the protruding portion may apply an excessive surface pressure to the membrane. Therefore, the width of the side leakage channel is set to 0.1 mm or more, specifically, the electrode is made slightly smaller than the fitting recess. As a result, protrusion of the electrode from the fitting recess is suppressed, and application of an excessive surface pressure to the membrane can be suppressed. In order to reliably suppress protrusion of the electrode, the width of the side leakage channel is preferably 1 mm or more, and more preferably 1.5 mm or more.

<2> In the redox flow battery according to the embodiment,
the fitting recess may be constituted by an inner peripheral edge surface of the frame body and a surface of the bipolar plate, the surface facing the electrode.

In the above configuration, the outline shape of the frame body on the inner peripheral side forms the outline shape of an opening of the fitting recess. That is, a step portion formed by the frame body and the bipolar plate, the step portion being originally provided in the cell frame, functions as the fitting recess. With this configuration, the electrode is easily fitted in the fitting recess.

<3> In the redox flow battery according to the embodiment,
the fitting recess may be formed as a recess formed in a surface of the bipolar plate.

The frame body is a member to which a stress of a tightening mechanism that tightens members constituting a cell is applied. Therefore, there is a concern that when an electrode is sandwiched between adjacent frame bodies, an electrolyte leaks from the cell. According to the above configuration in which a fitting recess is formed in a bipolar plate, the possibility that an electrode is sandwiched between frame bodies can be significantly decreased.

<4> In the redox flow battery according to the embodiment,
the gap may be 1.5 mm or more and 3 mm or less.

When the gap is 1.5 mm or more and 3 mm or less, the amount of electrolyte flowing through the side leakage channel can be reduced while effectively suppressing application of an excessive surface pressure to the membrane. As a result, the battery performance of the redox flow battery can be improved.

DETAILS OF EMBODIMENTS ACCORDING TO THE PRESENT INVENTION

Hereinafter, redox flow batteries (RF batteries) according to embodiments of the present disclosure will be described. The present invention is not limited to the configurations described in the embodiments. The present invention is defined by the claims described below and is intended to cover all the modifications within the meaning and scope of equivalents of the claims.

Embodiment 1

A redox flow battery (hereinafter, an RF battery) according to an embodiment will be described on the basis of FIGS. 1 to 5.

<<RF Battery>>

Figure 1:
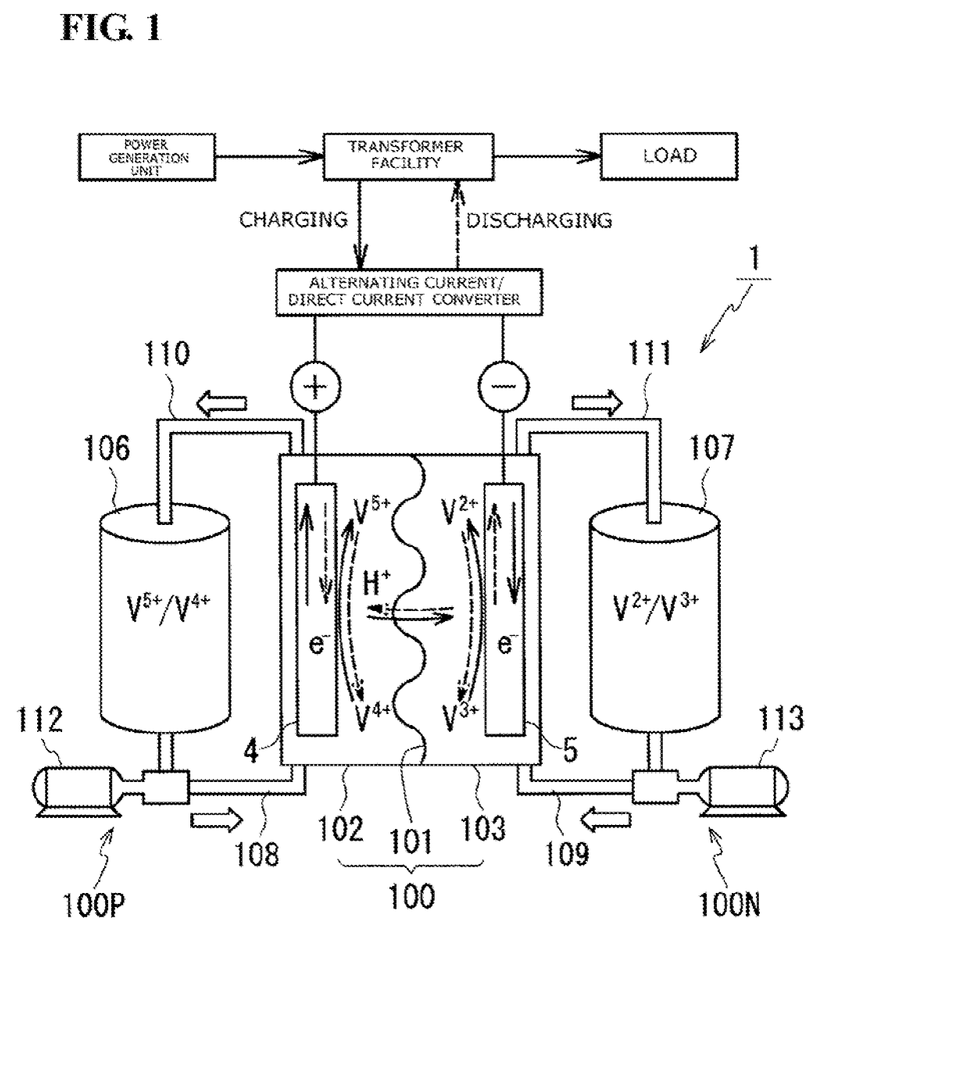
FIG. 1 a view illustrating the principle of operations of a redox flow battery according to Embodiment 1.

The RF battery is one of electrolyte-circulation storage batteries, and is used for storage of electricity of new energy from solar photovoltaic power generation and wind power generation. As illustrated in FIG. 1, which is a view illustrating the principle of operations of an RF battery 1, the RF battery 1 is a battery configured to be charged and discharged by means of the difference between the oxidation-reduction potential of active material ions contained in a positive electrode electrolyte, and the oxidation-reduction potential of active material ions contained in a negative electrode electrolyte. The RF battery 1 includes a cell 100, which is divided into a positive electrode cell 102 and a negative electrode cell 103 by a membrane 101 permeable to hydrogen ions.

The positive electrode cell 102 includes a positive electrode 4 therein, and a positive electrode electrolyte tank 106 storing a positive electrode electrolyte is connected to the positive electrode cell 102 via ducts 108 and 110. The duct 108 is equipped with a pump 112. These members 106, 108, 110, and 112 constitute a positive electrode circulation mechanism 100P configured to circulate the positive electrode electrolyte. Similarly, the negative electrode cell 103 includes a negative electrode 5 therein, and a negative electrode electrolyte tank 107 storing a negative electrode electrolyte is connected to the negative electrode cell 103 via ducts 109 and 111. The duct 109 is equipped with a pump 113. These members 107, 109, 111, and 113 constitute a negative electrode circulation mechanism 100N configured to circulate the negative electrode electrolyte. The electrolytes stored in the tanks 106 and 107 are circulated through the cells 102 and 103 with the pumps 112 and 113 during charging and discharging. When charging or discharging is not performed, the pumps 112 and 113 are stopped and the electrolytes are not circulated.

<<Cell Stack>>

Figure 2:
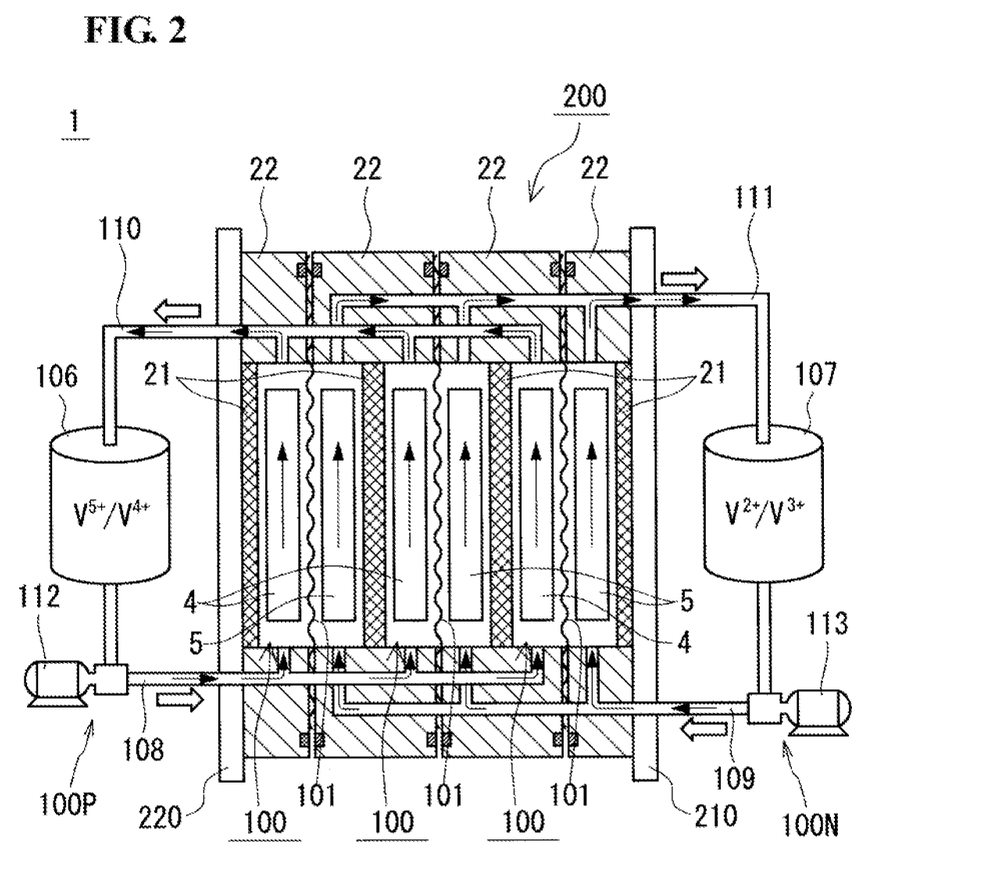
FIG. 2 is a schematic configuration view of a redox flow battery according to Embodiment 1.
Figure 3:
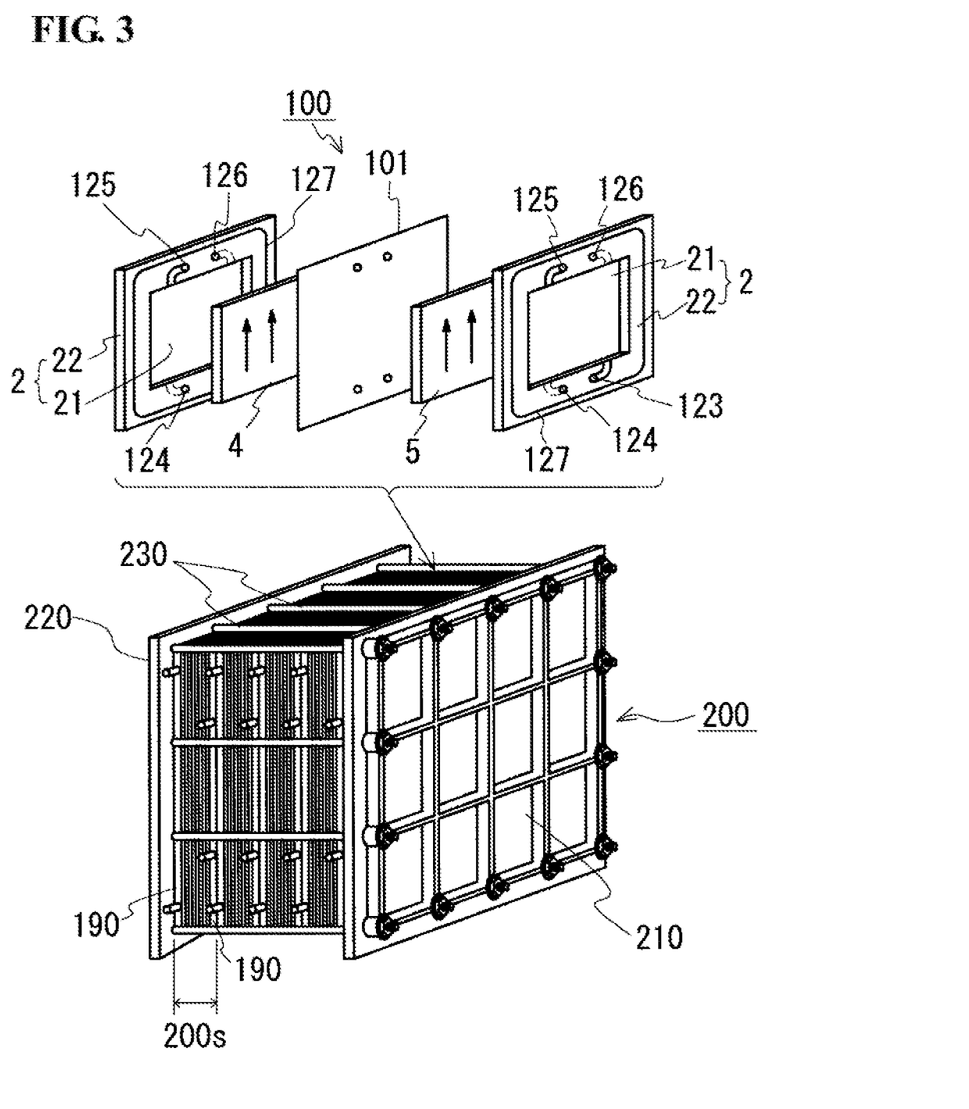
FIG. 3 is a schematic configuration view of a cell stack according to Embodiment 1.

The cell 100 is usually formed within a structure referred to as a cell stack 200, which is illustrated in FIGS. 2 and 3. The cell stack 200 is constituted by sandwiching a stack structure referred to as a sub-stack 200s (FIG. 3), from its both sides with two end plates 210 and 220, and by tightening the sub-stack 200s with a tightening mechanism 230 (in the configuration provided as an example in FIG. 3, a plurality of sub-stacks 200s are used).

Such a sub-stack 200s (FIG. 3) has a configuration in which a cell frame 2, a positive electrode 4, a membrane 101, and a negative electrode 5 are repeatedly stacked, and the resulting stack body is sandwiched between supply/drainage plates 190 and 190 (refer to the lower drawing in FIG. 3, omitted in FIG. 2).

<<Cell Frame>>

Such a cell frame 2 includes a frame body 22 having a through window and a bipolar plate 21, which covers the through window. Specifically, the frame body 22 supports the bipolar plate 21 on an outer peripheral side of the bipolar plate 21. The positive electrode 4 is disposed so as to be in contact with one of the surfaces of the bipolar plate 21, and the negative electrode 5 is disposed so as to be in contact with the other surface of the bipolar plate 21. In this configuration, a single cell 100 is formed between the bipolar plates 21 fitted in adjacent cell frames 2 (refer to the upper drawing in FIG. 3).

Flow of electrolytes in the cell 100 through the supply/drainage plates 190 and 190, which are illustrated in the lower drawing in FIG. 3, is performed with liquid-supplying manifolds 123 and 124 and liquid-draining manifolds 125 and 126 formed in the frame body 22 of the cell frame 2

Figure 4:
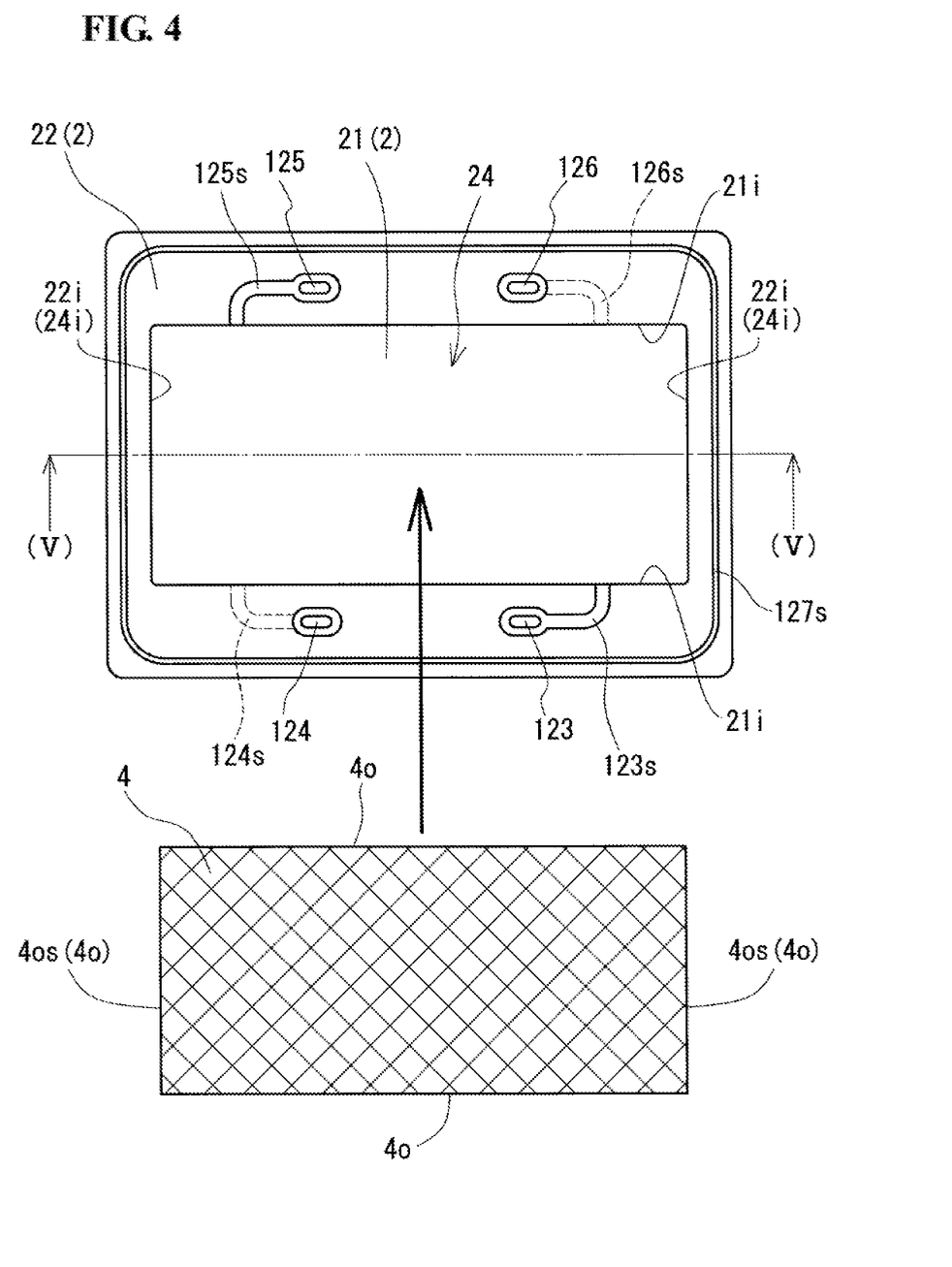
FIG. 4 is a plan view of an assembly of a cell frame and electrodes according to Embodiment 1 when the assembly is viewed from one surface side thereof.

(also refer to FIG. 4). The positive electrode electrolyte is supplied from the liquid-supplying manifold 123, then through an inlet slit 123s (FIG. 4) formed in one surface of the cell frame 2 (the surface illustrated as being exposed in the drawing), to the positive electrode 4; and the positive electrode electrolyte is drained through an outlet slit 125s (FIG. 4) formed in an upper portion of the cell frame 2 to the liquid-draining manifold 125. Similarly, the negative electrode electrolyte is supplied from the liquid-supplying manifold 124, then through an inlet slit 124s (FIG. 4) formed in the other surface of the cell frame 2 (the surface illustrated as being hidden in the drawing), to the negative electrode 5; and the negative electrode electrolyte is drained through an outlet slit 126s (FIG. 4) formed in an upper portion of the cell frame 2 to the liquid-draining manifold 126. Loop-shaped seal members 127 (FIG. 3) such as O-rings or flat gaskets are individually disposed between the cell frames 2 to suppress leakage of electrolytes from the sub-stack 200s. In this embodiment, as illustrated in FIG. 4, a seal groove 127s into which an O-ring is inserted is formed in the cell frame 2 (when a flat gasket is used, the seal groove 127s may be omitted). In addition, seal members may be disposed so as to surround the outer peripheries of the manifolds 123, 124, 125, and 126, though not illustrated in the figure. The direction in which overall electrolytes flow (flow direction) in such a cell frame 2 is a direction from a frame piece of the frame body 22 having the liquid-supplying manifolds 123 and 124 toward a frame piece of the frame body 22 having the liquid-draining manifolds 125 and 126, that is, the upward direction in the drawing of FIG. 4.

Figure 5:
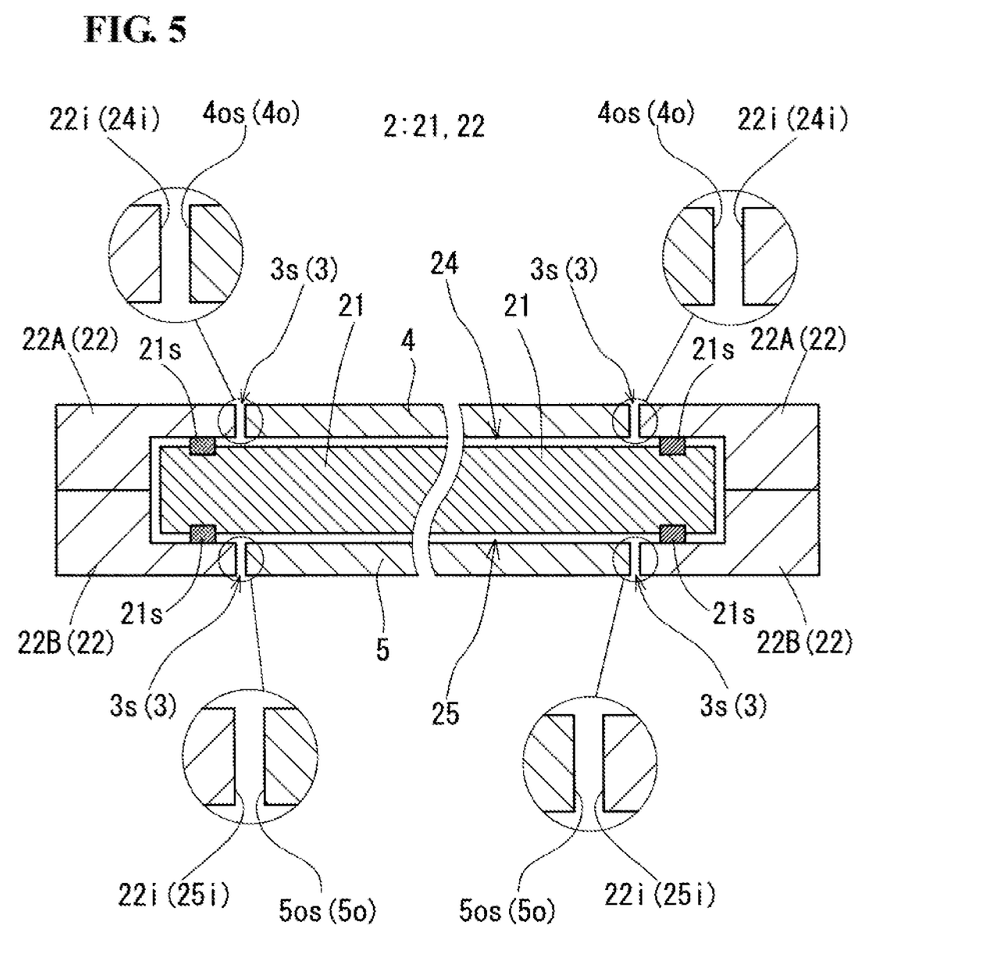
FIG. 5 is a sectional view taken along line V-V in FIG. 4.

As illustrated in FIG. 5, which is a sectional view taken along line V-V in FIG. 4, the frame body 22 of this embodiment is formed by bonding two frame-shaped divided bodies 22A and 22B whose sectional shapes are symmetric with respect to a stacking direction (the up-down direction in the drawing). The frame-shaped divided bodies 22A and 22B are formed so as to have thin portions on the through window side thereof (on the center side in the drawing). When the two frame-shaped divided bodies 22A and 22B are bonded to each other, a space for housing an outer peripheral edge portion of the bipolar plate 21 is formed between the thin portions of the two frame-shaped divided bodies 22A and 22B.

The material of the frame body 22 preferably has a good insulating property and more preferably also has acid resistance. Examples of the material of the frame body 22 include vinyl chloride, chlorinated polyethylene, and chlorinated paraffin.

As illustrated in the sectional view of FIG. 5, the bipolar plate 21 is a member having one surface side that contacts the positive electrode 4 and the other surface side that contacts the negative electrode 5. The bipolar plate 21 of this embodiment is a plate member having a substantially uniform thickness.

As illustrated in FIG. 5, the outer peripheral edge portion of the bipolar plate 21 is sandwiched between the two frame-shaped divided bodies 22A and 22B that constitute the frame body 22. With this sandwiched structure, the bipolar plate 21 is integrally fixed to the frame body 22. The outer peripheral edge portion of the bipolar plate 21 is provided with grooves. O-rings (seal members) 21s are disposed in the grooves. These seal members 21s suppress flow of an electrolyte between the one surface side and the other surface side of the bipolar plate 21.

The material of the bipolar plate 21 preferably has good conductivity and more preferably also has acid resistance and flexibility. An example of the material is a conductive material containing a carbon material. Specifically, examples thereof include conductive plastics formed of graphite and a chlorinated organic compound. Alternatively, part of the graphite of the conductive plastics may be replaced by at least one of carbon black and diamond-like carbon. Examples of the chlorinated organic compound include vinyl chloride, chlorinated polyethylene, and chlorinated paraffin. When the bipolar plate 21 is formed of such a material, the bipolar plate 21 can have low electrical resistance, good acid resistance, and good flexibility.

<<Electrode>>

As illustrated in FIG. 5, the positive electrode 4 and the negative electrode 5 are respectively disposed on one surface side (on the upper side of the drawing) and the other surface side (on the lower side of the drawing) of the bipolar plate 21. More specifically, the positive electrode 4 (negative electrode 5) is fitted in a fitting recess 24 (25) constituted by an inner peripheral edge surface 22i of the frame body 22 (refer to the circled enlarged views) and a surface of the bipolar plate 21, the surface facing the positive electrode 4 (negative electrode 5). With regard to the fitting recess 24, also refer to FIG. 4. In FIG. 4, the fitting recess 25 (FIG. 5) is not illustrated. However, the fitting recess 25 has the same configuration as the fitting recess 24.

In the configuration in which the electrodes 4 and 5 are respectively fitted in the fitting recesses 24 and 25 of the cell frame 2, leakage channels 3 are formed between outer peripheral edge surfaces 4o and 5o of the electrodes 4 and 5 and the inner wall surfaces 24i and 25i (inner peripheral edge surfaces 22i) of the fitting recesses 24 and 25. Among the leakage channels 3, in particular, portions parallel to a direction in which electrolytes flow (in FIG. 5, the direction from the surface illustrated as being exposed in the drawing toward the surface illustrated as being hidden in the drawing) are referred to as side leakage channels 3s. Specifically, the side leakage channels 3s are formed between side edge surfaces 4os and 5os of the electrodes 4 and 5 and the corresponding inner wall surfaces 24i and 25i of the fitting recesses 24 and 25, the inner wall surfaces 24i and 25i facing the corresponding side edge surfaces 4os and 5os. The width of each of the side leakage channels 3s affects the discharge capacity of the RF battery 1 (FIGS. 1 and 2). This is because when the width of the side leakage channel 3s is increased, the amounts of electrolytes that are drained to the outside of the cell 100 (FIGS. 1 and 2) substantially without contacting the electrodes 4 and 5 increase. From this viewpoint, it is believed that when the width (the left-right direction in the drawing) of the side leakage channel 3s is decreased, the amount of electrolyte flowing through the side leakage channel 3s can be reduced, and a decrease in the discharge capacity of the RF battery 1 can be suppressed. In this embodiment, the width of the side leakage channel 3s is 12 mm or less. As a result, a decrease in the discharge capacity of the RF battery 1 is effectively suppressed. A decrease in the width of the side leakage channel 3s enables the amount of electrolyte flowing through the side leakage channel 3s to be reduced. Therefore, the width of the side leakage channel 3s is preferably 6 mm or less, and more preferably 3 mm or less.

With a decrease in the width of the side leakage channel 3s, the amount of electrolyte flowing through the side leakage channel 3s can be reduced. However, when the width of the side leakage channel 3s is excessively small, there is a concern that the membrane 101 that directly faces the electrodes 4 and 5 (refer to the upper drawing in FIG. 3) may be damaged. This is because when the width of the side leakage channel 3s is excessively small, during the compression of the cell 100 (FIG. 1) or during flow of electrolytes, outer peripheral edge portions of the electrodes 4 and 5 may protrude from the fitting recesses 24 and 25, and the protruding portions may extend on the frame body 22 and apply an excessive surface pressure to the membrane 101. Therefore, the width of the side leakage channel 3s is set to 0.1 mm or more, specifically, the electrodes 4 and 5 are respectively made slightly smaller than the fitting recesses 24 and 25, thereby suppressing protrusion of the electrodes 4 and 5 from the fitting recesses 24 and 25 to suppress application of an excessive surface pressure to the membrane 101. In order to reliably suppress protrusion of the electrodes 4 and 5, the width of the side leakage channel 3s is preferably 1 mm or more, and more preferably 1.5 mm or more.

Herein, the electrodes 4 and 5 are formed of porous bodies. Even when the electrodes 4 and 5 are compressed between adjacent cell frames 2, the sizes of the electrodes 4 and 5 in the planar direction do not substantially change. Accordingly, when the cell stack 200 (FIG. 3) is disassembled and the width of the side leakage channel 3s between the fitting recess 24 (25) and the electrode 4 (5) in FIG. 5 is measured, the measured value is considered to be equal to the width of the side leakage channel 3s in the cell stack 200. Specifically, the width of the side leakage channel 3s measured in a state where an uncompressed electrode 4 (5) is fitted in the fitting recess 24 (25) prior to assembly of the cell stack 200, the width of the side leakage channel 3s in the cell stack 200, and the width of the side leakage channel 3s measured after disassembly of the cell stack 200 are considered to be substantially equal to each other.

The material of the electrodes 4 and 5 preferably has good conductivity and more preferably also has acid resistance. For example, a woven fabric or a non-woven fabric formed of fibers of a carbon material may be used to form the electrodes 4 and 5. Alternatively, carbon paper or the like may also be used as the electrodes 4 and 5.

Test Example

A plurality of RF batteries 1 (testing samples A to G) having different widths of side leakage channels 3s were prepared. A charge-discharge test was conducted with each of the testing samples A to G, and the cell resistivities of the testing samples A to G were compared. Regarding conditions for the charge-discharge test, the end-of-discharge voltage was 1 V, the end-of-charge voltage was 1.6 V, and the current was 120 mA/cm$^2$. In the evaluation of the discharge capacity/current efficiency, a charge-discharge curve was prepared on the basis of the charge-discharge test, and the evaluation of the discharge capacity/current efficiency of the third cycle was conducted by using the charge-discharge curve.

Testing sample A . . . RF battery 1 having width of side leakage channel 3s of 0.0 mm Testing sample B . . . RF battery 1 having width of side leakage channel 3s of 0.1 mm Testing sample C . . . RF battery 1 having width of side leakage channel 3s of 1.5 mm Testing sample D . . . RF battery 1 having width of side leakage channel 3s of 3 mm Testing sample E . . . RF battery 1 having width of side leakage channel 3s of 6 mm Testing sample F . . . RF battery 1 having width of side leakage channel 3s of 12 mm Testing sample G . . . RF battery 1 having width of side leakage channel 3s of 13 mm After the charge-discharge test, the testing samples A to G were disassembled. According to the results, in the testing sample A, in which the width of the side leakage channel 3s was substantially 0.0 mm, breakage occurred in a portion of the membrane 101, the portion corresponding to the fitting recess 24 (25). It is believed that the breakage of the membrane 101 occurred because the electrodes 4 and 5 protruded from the fitting recesses 24 (25) during compression of the cell 100, and the protruding portions extended on the frame body 22, resulting in a stress concentration on the membrane 101. On the other hand, in the testing sample G, in which the width of the side leakage channel 3s was very wide, namely, 13 mm, elongation of a membrane 101 was observed in a portion of the membrane 101, the portion being close to the fitting recess 24 (25). It is believed that the elongation of the membrane 101 of the testing sample G occurred because the membrane 101 was elongated by receiving the pressure difference generated between the positive electrode 4 and the negative electrode 5 or the repulsive force between the electrodes 4 and 5 in the portion of the wide side leakage channel 3s. In the other testing samples B, C, D, E, and F, defects such breakage or the formation of elongation of the membrane 101 were not observed.

In the evaluation of the charge-discharge test, the evaluation of the testing sample A could not be performed. According to the results of disassembly of the cell 100 of the testing sample A after the test, breakage of the membrane 101 was confirmed. The evaluation of the testing samples B to G could be performed. The testing samples C and D had the highest discharge capacity. The discharge capacities of the other testing samples B, E, F, and G were lower than the discharge capacity of the testing samples C and D by −3%, −4%, −7%, and −30%, respectively. The testing samples C, D, and E had the highest current efficiency of 98% The other testing samples B, F, and G had current efficiencies of 97%, 97%, and 60%, respectively. Thus, a decrease in the current efficiency was observed.

The results of Test Example described above showed that when the width of the side leakage channel 3s was 0.1 mm or more and 12 mm or less, defects such as breakage and elongation were unlikely to be generated in the membrane 101, and a decrease in the discharge capacity of the RF battery 1 was suppressed. It also became clear that, from the viewpoint of suppressing a decrease in the discharge capacity of the RF battery 1, the width of the side leakage channel 3s is preferably 6 mm or less, and more preferably 3 mm or less.

Embodiment 2

Figure 6:
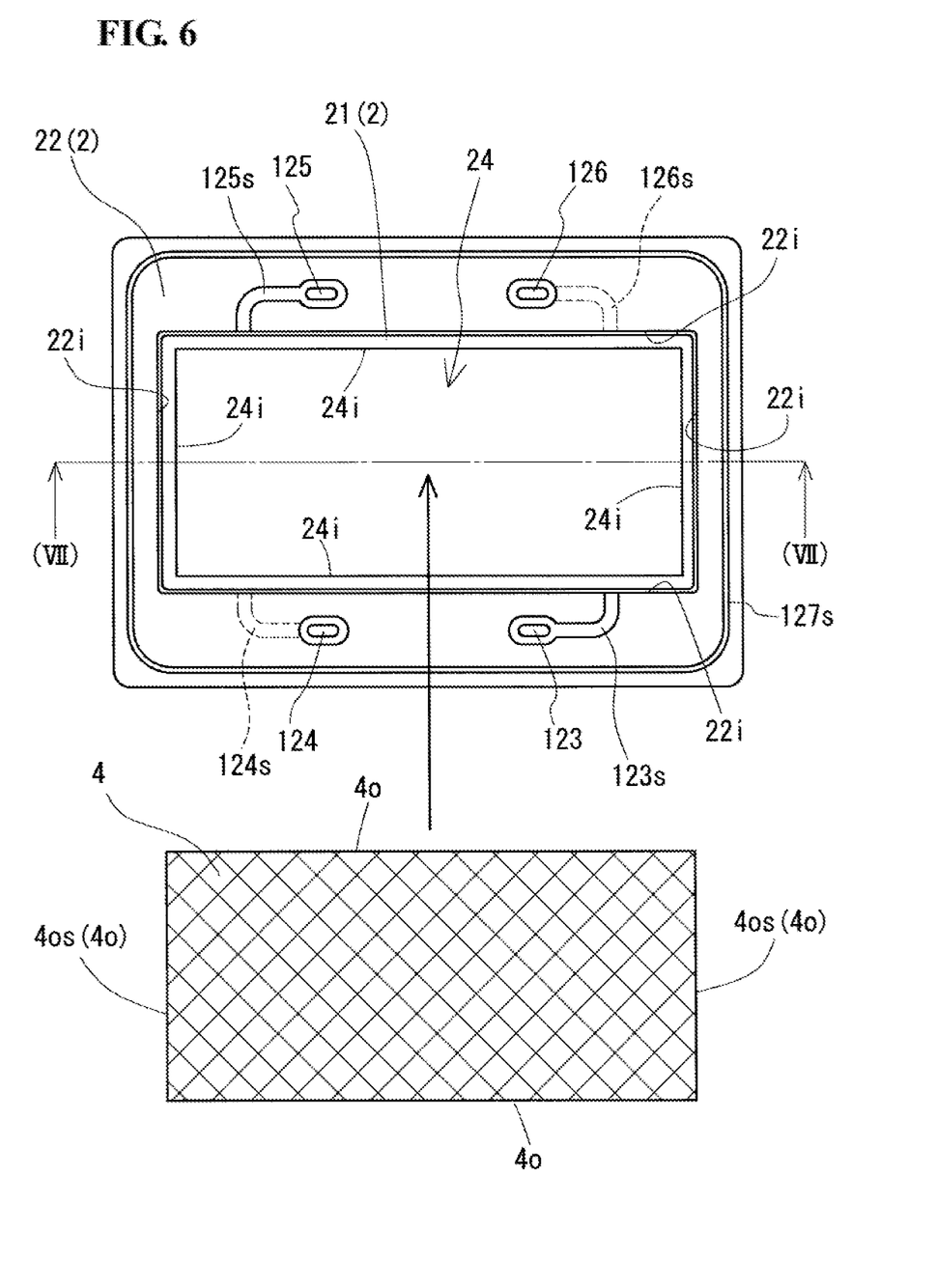
FIG. 6 is a plan view of an assembly of a cell frame and electrodes according to Embodiment 2 when the assembly is viewed from one surface side thereof.

In Embodiment 2, a configuration in which fitting recesses 24 and 25 of electrodes 4 and 5 are provided in a bipolar plate 21 will be described on the basis of FIGS. 6 and 7. FIG. 6 is a plan view of a cell frame 2 when viewed from the positive electrode 4 side, and FIG. 7 is a sectional view taken along line VII-VII in FIG. 6.

Figure 7:
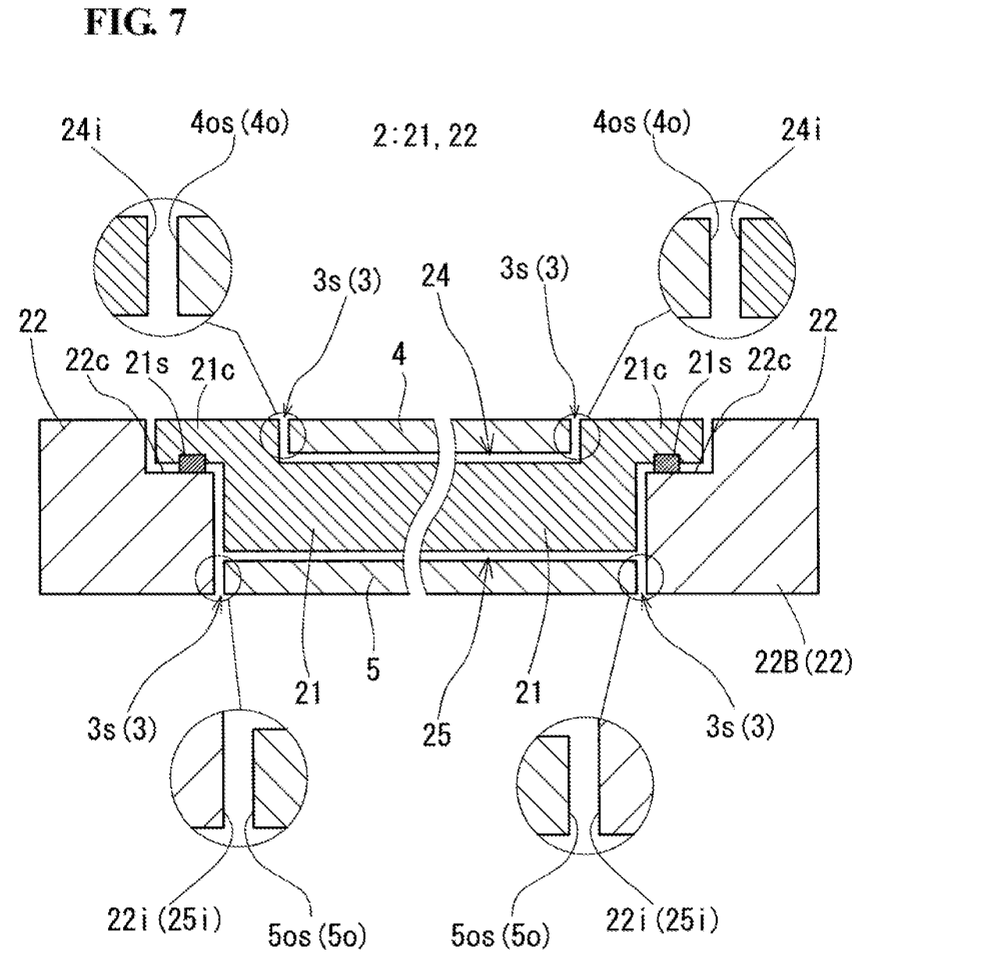
FIG. 7 is a sectional view taken along line VII-VII in FIG. 6.

As illustrated in FIG. 7, the cell frame 2 of this embodiment has a fitting structure in which an outer peripheral edge portion 21c of a bipolar plate 21, the outer peripheral edge portion 21c being formed so as to have a small thickness, is engaged with a step portion 22c formed in an inner peripheral edge portion (a portion close to a through window) of a frame body 22. The step portion 22c is configured so that the thickness of a peripheral portion of the frame body 22, the peripheral portion surrounding the entire circumference of the through window of the frame body 22, is smaller than the thickness of the other portion of the frame body 22. In addition, the outer peripheral edge portion 21c of the bipolar plate 21 locally has a small thickness so as to engage with the step portion 22c of the frame body 22. The surface of the outer peripheral edge portion 21c is substantially flush with two surfaces of portions other than the step portion 22c in the frame body 22 when the outer peripheral edge portion 21c of the bipolar plate 21 is fitted in the step portion 22c of the frame body 22. On the other hand, a surface of the bipolar plate 21, the surface being adjacent to the negative electrode 5, is disposed at a position recessed with respect to a surface of the frame body 22 when the outer peripheral edge portion 21c of the bipolar plate 21 is fitted in the step portion 22c of the frame body 22.

By fitting the bipolar plate 21 in the step portion 22c, the step portion 22c of the frame body 22 and the outer peripheral edge portion 21c of the bipolar plate 21 are engaged with each other over the entire circumference in the thickness direction of the frame body 22. As a result, the through window of the frame body 22 is covered with the bipolar plate 21. Here, as illustrated in FIG. 5, in the case where a fitting structure is used, it is necessary to seal a gap between the frame body 22 and the bipolar plate 21 so that an electrolyte does not flow between one surface side and the other surface side of the bipolar plate 21. In this embodiment, a loop-shaped groove is formed in a part of the outer peripheral edge portion 21c of the bipolar plate 21, the part facing the step portion 22c, and an O-ring (seal member) 21s is disposed in the groove. When a plurality of cell frames 2 are stacked and tightened, the O-ring 21s is compressed and functions as a seal. Alternatively, the gap between the step portion 22c of the frame body 22 and the outer peripheral edge portion 21c of the bipolar plate 21 may be sealed with a flat gasket, an adhesive, or the like.

In addition, the fitting recess 24 in which the positive electrode 4 is fitted is formed in a portion of the bipolar plate 21 of this embodiment, the portion facing the positive electrode 4 (also refer to FIG. 4). In this case, a side leakage channel 3s is formed between an inner wall surface 24i of the fitting recess 24 formed in the bipolar plate 21 and a side edge surface 4os of the positive electrode 4. The width of this side leakage channel 3s is also 0.1 mm or more and 12 mm or less as in Embodiment 1. Consequently, a decrease in the discharge capacity of the RF battery 1 (FIGS. 1 and 2) can be suppressed while suppressing damage of the membrane 101 (FIG. 3) that directly faces the positive electrode 4. The upper limit of the width of the side leakage channel 3s is preferably 6 mm or less, and more preferably 3 mm or less. The lower limit of the width of the side leakage channel 3s is preferably 1 mm or more, and more preferably 1.5 mm or more.

On the other hand, the fitting recess 25 in which the negative electrode 5 is fitted is constituted by an inner peripheral edge surface 22i of the frame body 22 and a surface of the bipolar plate 21, the surface facing the negative electrode 5, as in Embodiment 1. Accordingly, a side leakage channel 3s is formed between the inner peripheral edge surface 22i and a side edge surface 5os of the negative electrode 5. The width of this side leakage channel 3s on the negative electrode 5 side is preferably determined as in Embodiment 1. In such a case, a decrease in the discharge capacity of the RF battery 1 (FIGS. 1 and 2) can be suppressed while suppressing damage of the membrane 101 (FIG. 3) that directly faces the negative electrode 5.

<<Modification>>

Figure 8:
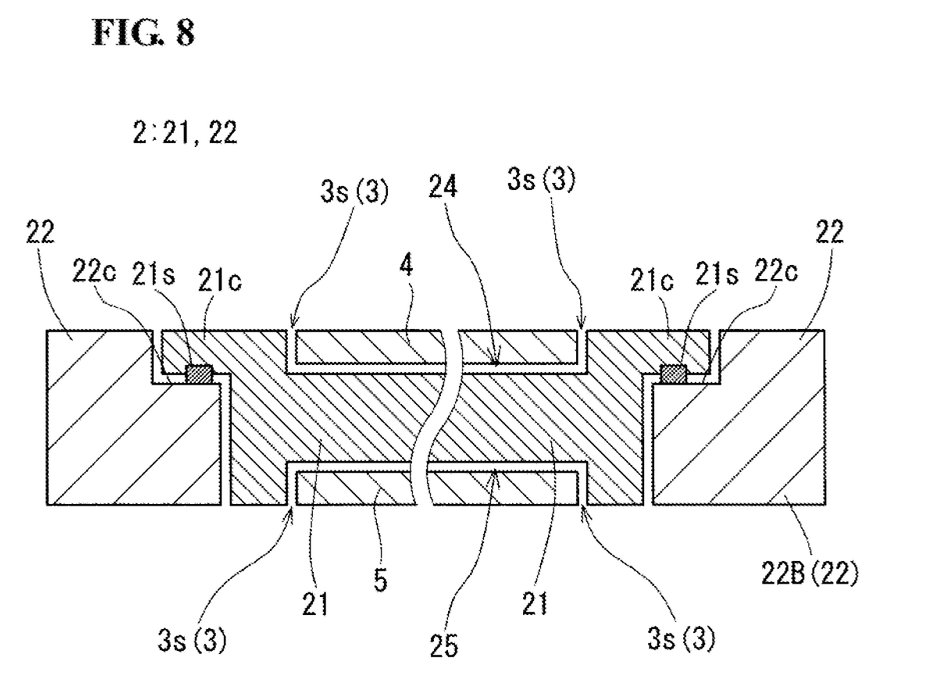
FIG. 8 is a cross-sectional view of an assembly of a cell frame and electrodes according to a modification.

As illustrated in FIG. 8, in addition to the formation of a fitting recess 24 in a surface of a bipolar plate 21, the surface being adjacent to the positive electrode 4, a fitting recess 25 may also be formed in a surface of the bipolar plate 21, the surface being adjacent to the negative electrode 5. With this configuration, the size of the positive electrode 4 in the planar direction can be made same as the size of the negative electrode 5 in the planar direction.

Embodiment 3

In the configuration in which the bipolar plate 21 is sandwiched between the two frame-shaped divided bodies 22A and 22B, the configuration being illustrated in FIG. 5 of Embodiment 1, a recess may be formed in a portion of the bipolar plate 21, the portion corresponding to the positive electrode 4 (negative electrode 5), and the positive electrode 4 (negative electrode 5) may be fitted in the recess. In this configuration, a fitting recess 24 (25) is formed by the recess of the bipolar plate 21 on the positive electrode 4 side (negative electrode 5 side) and the inner peripheral edge surface 22i of the frame body 22.

REFERENCE SIGNS LIST

1 RF battery (redox flow battery)
2 cell frame
  21 bipolar plate
    21c outer peripheral edge portion 21s O-ring (seal member)
  22 frame body
    22A, 22B frame-shaped divided body
    22c step portion 22i inner peripheral edge surface 22s O-ring (seal member)
  24, 25 fitting recess 24i, 25i inner wall surface
  123, 124 liquid-supplying manifold 125, 126 liquid-draining manifold
    123s, 124s inlet slit 125s, 126s outlet slit
  127 seal member 127s seal groove
3 leakage channel 3s side leakage channel
4 positive electrode
  4o outer peripheral edge surface 4os side edge surface
5 negative electrode
  5o outer peripheral edge surface 5os side edge surface
100 cell 101 membrane 102 positive electrode cell 103 negative electrode cell
  100P positive electrode circulation mechanism 100N negative electrode circulation mechanism
    106 positive electrode electrolyte tank 107 negative electrode electrolyte tank
    108, 109, 110, 111 duct 112, 113 pump
  190 supply/drainage plate
200 cell stack
  200s sub-stack
  210, 220 end plate
  230 tightening mechanism

The invention claimed is:

1. A redox flow battery comprising:
a positive electrode;
a cell frame including a frame body and a bipolar plate and having a first fitting recess in which the positive electrode is fitted and a second fitting recess in which a negative electrode is fitted;
a membrane disposed so as to sandwich the positive electrode between the bipolar plate and the membrane; and
an electrode electrolyte tank, wherein
a space for housing an outer peripheral edge portion of the bipolar plate is formed in the frame body, a gap between, among outer peripheral edge surfaces of the positive electrode, a side edge surface of the positive electrode parallel to a direction in which an electrolyte in fluid connection with the electrode electrolyte tank flows and an inner wall surface of the first fitting recess, the inner wall surface facing the side edge surface, is 1.5 mm or more and 3 mm or less, and a gap between, among outer peripheral edge surfaces of the negative electrode, a side edge surface of the negative electrode parallel to a direction in which an electrolyte in fluid connection with the electrode electrolyte tank flows and an inner wall surface of the second fitting recess, the inner wall surface facing the side edge surface, is 1.5 mm or more and 3 mm or less.

2. The redox flow battery according to claim 1, wherein each of the first fitting recess and the second fitting recess is constituted by an inner peripheral edge surface of the frame body and a surface of the bipolar plate, the surface of the bipolar plate corresponding to the first fitting recess facing the positive electrode, and the surface of the bipolar plate corresponding to the second fitting recess facing the negative electrode.

3. A redox flow battery comprising:
a positive electrode;
a cell frame including a frame body and a bipolar plate and having a fitting recess in which the positive electrode is fitted;
a membrane disposed so as to sandwich the positive electrode between the bipolar plate and the membrane; and
an electrode electrolyte tank, wherein
the cell frame has a fitting structure in which an outer peripheral edge portion of the bipolar plate is engaged with a step portion formed in an inner peripheral edge portion of the frame body, the outer peripheral edge portion being formed so as to have a thickness that is smaller than a total thickness of the bipolar plate;
the fitting recess in which the positive electrode is fitted is further formed in a portion of the bipolar plate, the portion facing the positive electrode; and
a width of a side leakage channel formed between an inner wall surface of the fitting recess formed in the bipolar plate and a side edge surface of the positive electrode, and a width of a side leakage channel between a side edge surface of a negative electrode and an inner wall surface of the frame body, the inner wall surface facing the side edge surface, are 1.5 mm or more and 3 mm or less.

4. A redox flow battery comprising:
a positive electrode;
a cell frame including a frame body and a bipolar plate and having a fitting recess in which the positive electrode is fitted;
a membrane disposed so as to sandwich the positive electrode between the bipolar plate and the membrane; and
an electrode electrolyte tank, wherein
the cell frame has a fitting structure in which an outer peripheral edge portion of the bipolar plate is engaged with a step portion formed in an inner peripheral edge portion of the frame body, the outer peripheral edge portion being formed so as to have a thickness that is smaller than a total thickness of the bipolar plate;
the fitting recess in which the positive electrode is fitted is further formed in a portion of the bipolar plate, the portion facing the positive electrode;
a second fitting recess in which a negative electrode is fitted is further formed in a portion of the bipolar plate, the portion facing the negative electrode;
a width of a side leakage channel formed between an inner wall surface of the fitting recess formed in the bipolar plate and a side edge surface of the positive electrode, and a width of a side leakage channel formed between an inner wall surface of the second fitting recess formed in the bipolar plate and a side edge surface of the negative electrode are 1.5 mm or more and 3 mm or less.

5. The redox flow battery according to claim 1, wherein the cell frame comprises two frame-shaped divided bodies, wherein the outer peripheral edge portion of the bipolar plate is sandwiched between the two frame-shaped divided bodies.

6. The redox flow battery according to claim 1, further comprising a seal member disposed between the outer peripheral edge portion of the bipolar plate and the frame body.

* * * * *